US010827028B1

(12) United States Patent
Bromand et al.

(10) Patent No.: US 10,827,028 B1
(45) Date of Patent: Nov. 3, 2020

(54) SYSTEMS AND METHODS FOR PLAYING MEDIA CONTENT ON A TARGET DEVICE

(71) Applicant: Spotify AB, Stockholm (SE)

(72) Inventors: Daniel Bromand, Boston, MA (US); Björn Erik Roth, Stockholm (SE); David Gustafsson, Stockholm (SE); Philip Edmonds, Arlington, MA (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/562,318

(22) Filed: Sep. 5, 2019

(51) Int. Cl.
*H04L 29/08* (2006.01)
*H04L 12/24* (2006.01)
*G10L 15/22* (2006.01)
*G10L 15/08* (2006.01)

(52) U.S. Cl.
CPC ............ *H04L 67/303* (2013.01); *G10L 15/08* (2013.01); *G10L 15/22* (2013.01); *H04L 41/12* (2013.01); *G10L 2015/088* (2013.01); *G10L 2015/223* (2013.01)

(58) Field of Classification Search
CPC ....... H04L 67/303; H04L 41/12; G10L 15/08; G10L 15/22; G10L 2015/223; G10L 15/088
See application file for complete search history.

(56) References Cited

U.S. PATENT DOCUMENTS

| 9,153,239 | B1 | 10/2015 | Postelnicu et al. |
| 9,319,782 | B1 | 4/2016 | Crump et al. |
| 9,431,021 | B1 * | 8/2016 | Scalise ................... G10L 21/00 |
| 9,684,715 | B1 | 6/2017 | Ross et al. |
| 9,916,839 | B1 * | 3/2018 | Scalise ................... G10L 21/00 |
| 9,940,949 | B1 | 4/2018 | Vitaladevuni et al. |
| 10,074,371 | B1 | 9/2018 | Wang et al. |
| 10,192,546 | B1 | 1/2019 | Piersol et al. |
| 10,283,116 | B2 * | 5/2019 | Ko ......................... G06F 3/0482 |
| 10,304,475 | B1 | 5/2019 | Wang et al. |
| 2013/0013315 | A1 | 1/2013 | Burke et al. |

(Continued)

FOREIGN PATENT DOCUMENTS

| CN | 108847219 A | 11/2018 |
| CN | 109741755 A | 5/2019 |

(Continued)

OTHER PUBLICATIONS

Bingham, "A fast fixed-point algorithm for independent component analysis of complex valued signals," Neural Networks Research Centre, Helsinki University of Technology, Finland, Jan. 19, 2000, 16 pgs.

(Continued)

*Primary Examiner* — Michael C Lai
(74) *Attorney, Agent, or Firm* — Morgan, Lewis & Bockius LLP

(57) ABSTRACT

A first device receives a voice command from a first user of a second device. The first device determines, from content in the voice command, one or more characteristics of a target device and media content to be played on the target device. The first device identifies, using the characteristics of the target device, a third device. In response to identifying the third device: the first device modifies account information for the third device to associate the third device with the first user and transmits instructions to the third device to play the media content.

14 Claims, 8 Drawing Sheets

(56) References Cited

U.S. PATENT DOCUMENTS

| | | | |
|---|---|---|---|
| 2014/0185815 | A1 | 7/2014 | Robleck et al. |
| 2015/0162006 | A1 | 6/2015 | Kummer |
| 2015/0331666 | A1 | 11/2015 | Bucsa et al. |
| 2016/0307570 | A1 | 10/2016 | Mizumoto et al. |
| 2017/0069321 | A1 | 3/2017 | Toiyama |
| 2017/0097992 | A1 | 4/2017 | Voulin et al. |
| 2018/0012593 | A1 | 1/2018 | Prasad et al. |
| 2018/0122378 | A1* | 5/2018 | Mixter .............. H04L 67/306 |
| 2018/0189390 | A1 | 7/2018 | Crèmer et al. |
| 2018/0190264 | A1* | 7/2018 | Mixter ................ H04L 67/26 |
| 2018/0211666 | A1* | 7/2018 | Kolavennu ........ H04L 12/2816 |
| 2018/0233136 | A1* | 8/2018 | Torok ................... G06F 3/167 |
| 2018/0233137 | A1* | 8/2018 | Torok .................... G10L 15/22 |
| 2018/0286433 | A1 | 10/2018 | Hicks et al. |
| 2019/0074014 | A1 | 3/2019 | Wilberding |
| 2019/0096419 | A1 | 3/2019 | Giacobello |
| 2019/0251960 | A1* | 8/2019 | Maker ................... G10L 15/08 |
| 2019/0320260 | A1 | 10/2019 | Alders et al. |
| 2019/0355365 | A1* | 11/2019 | Kim ..................... G06F 1/3215 |

FOREIGN PATENT DOCUMENTS

| | | | | |
|---|---|---|---|---|
| EP | 2306344 | A1 | 4/2011 | |
| EP | 2939103 | A2 | 11/2015 | |
| WO | WO2009/001202 | A1 | 12/2008 | |
| WO | WO2018236952 | A1 | 12/2018 | |
| WO | WO-2019034083 | A1 * | 2/2019 | .............. H04W 4/02 |
| WO | WO2019034083 | A1 | 2/2019 | |
| WO | WO2019046173 | A1 | 3/2019 | |
| WO | WO2019/160787 | A1 | 8/2019 | |

OTHER PUBLICATIONS

E&T Engineering and Technology, "Amazon proposes bundling multiple virtual assistants in a single device," Sep. 25, 2019, downloaded from https://eandt.theiet.org/content/articles/2019/amazon-proposes-bundling-multiple-virtual-assistnts-in-a-single-device/, 4 pgs.

Saruwatari, "Blind Source Separation Combining Independent Component analysis and Beamforming," EURASIP Journal on Applied Signal Processing 2003:11, 1135-1146, © 2003 Hindawi Publishing Corporation, 12 pgs.

Heo et al., Cover Song Identification with Metric Learning Using Distance as a Feature, 18th International Society for Music Information Retrieval Conference, Suzhou, China 2017, 7 pgs.

Singh et al. "A loss function for classification based on a robust similarity metric," 978-1-4244-B126-2/10, ©2010, 1 pg.

* cited by examiner

```
{ "body": [
    {
      "text": {
        "title": "Today's Top Hits",
        "subtitle": "by Example Media Service"
      },
      "images": {
        "main": {
          "uri": "https://example.co/images/pl/default/
e0f8c10b6f4a7cfa83beafa8e227ba06bdf85c2f"
        }
      },
      "target": {
        "uri": "example:playlist:37i9dQZF1DXcBWIGoYBM5M"
      }
    },...
  ],
  "custom": {
    "ttsPrompt": "<speak xml:lang=\"en-us\">Today's Top Hits.</speak>",
    "playBackDevice": "kitchen",
    "intent": "PLAY",
    "query": "Play Today's Top Hits on kitchen"
  }
}
```

```
┌─────────────────────────────────────────────────────────────┐
│ At a first electronic device having one or more processors   │──502
│ and memory storing instructions for execution by the one or  │
│ more processors:                                             │
└─────────────────────────────────────────────────────────────┘
                              │
                              ▼
┌─────────────────────────────────────────────────────────────┐
│ Receive a voice command from a first user of a second       │
│ electronic device. The second electronic device is distinct │──504
│ from the first electronic device.                           │
│ ┌─────────────────────────────────────────────────────────┐ │
│ │ The first user is automatically identified using the    │ │──506
│ │ voice command.                                          │ │
│ └─────────────────────────────────────────────────────────┘ │
└─────────────────────────────────────────────────────────────┘
                              │
                              ▼
┌─────────────────────────────────────────────────────────────┐
│ Determine from content in the voice command:                │
│    one or more characteristics of a target device; and      │──508
│    media content to be played on the target device.         │
│ ┌─────────────────────────────────────────────────────────┐ │
│ │ The one or more characteristics of the target device    │ │
│ │ include one or more characteristics selected from the   │ │──510
│ │ group consisting of: a name of the target device, a     │ │
│ │ brand of the target device, and a model of the target   │ │
│ │ device.                                                 │ │
│ └─────────────────────────────────────────────────────────┘ │
│ ┌─────────────────────────────────────────────────────────┐ │
│ │ The voice command identifies, as the media content, a   │ │──512
│ │ song, album, genre, or personalized playlist.           │ │
│ └─────────────────────────────────────────────────────────┘ │
│ ┌─────────────────────────────────────────────────────────┐ │
│ │ The voice command includes one or more keywords that    │ │──514
│ │ indicate whether the media content is a song, album,    │ │
│ │ genre, and/or playlist.                                 │ │
│ └─────────────────────────────────────────────────────────┘ │
└─────────────────────────────────────────────────────────────┘
                              │
                              ▼
┌─────────────────────────────────────────────────────────────┐
│ Identify, using the one or more characteristics of the       │
│ target device determined from the voice command, a third    │──516
│ electronic device that is distinct from the first electronic│
│ device and the second electronic device.                    │
│ ┌─────────────────────────────────────────────────────────┐ │
│ │ Identifying the third electronic device includes        │ │
│ │ matching the one or more characteristics of the target  │ │──518
│ │ device against characteristics of a set of candidate    │ │
│ │ devices.                                                │ │
│ └─────────────────────────────────────────────────────────┘ │
│                            (A)                               │
└─────────────────────────────────────────────────────────────┘
```

FIG. 5A

SYSTEMS AND METHODS FOR PLAYING MEDIA CONTENT ON A TARGET DEVICE

TECHNICAL FIELD

The disclosed embodiments relate generally to media playback, and, in particular, to playing media content on a target device based on a voice command received at a different device.

BACKGROUND

Access to electronic media, such as music and video content, has expanded dramatically over time. As a departure from physical media, media content providers stream media to electronic devices across wireless networks, improving the ease with which users can access such content.

Some devices are enabled to receive voice commands as a means of controlling media playback. However, a user may want the media to be played back on a different device than the device that receives the voice command (e.g., on a speaker that is separate from the device that receives the voice command).

SUMMARY

Thus, there is a need for systems and methods of playing media content on a target device based on a voice command received at a different device. For example, a user may provide a voice command, such as "Play Today's Top Hits in the kitchen," to his or her mobile phone. The voice command may be directed to a streaming media service with which the user has an account. Some embodiments described herein provide systems and methods that determine (e.g., at the cloud), from the voice command, characteristics of a target device (e.g., in this case, a speaker in the kitchen) as well as content to be played (e.g., in this case, a playlist called "Today's Top Hits"). The characteristics of the target device (e.g., a name (or alias) of the target device, a brand of the target device, device type, a type of specific network connectivity, and/or a model of the target device) are matched to a device that is associated with the user (e.g., a speaker device that the user is logged into, is connected with, has previously been logged into, or has previously been connected with). In some circumstances, the match can be a soft or partial match (e.g., the device is capable of determining a match between a target device indicated in a voice command and a distinct device name that corresponds to the indicated target device). For example, some embodiments will match "Play Today's Top Hits in the kitchen" to a device name (e.g., a name given to the device by the user) "Kitchen Speaker."

Thus, the systems and methods described herein provide technical advantages and improve the client and server computers described herein by simplifying the user-machine interface as it relates to accessing and controlling remote devices. More particularly, by matching a target device based on characteristics identified in a voice command, the systems and methods described herein enable the user to specify a device and use a voice command to control the device, thus simplifying the user-machine interface (e.g., by eliminating the need for the user to provide a series of inputs to navigate to a settings interface and/or a playback control interface), which, in turn, reduces the processing requirements of the device (e.g., the user need not navigate to an obscure setting interface on his or her device, or remember a peculiar "friendly name," but instead can, by voice, refer to, e.g., his or her "kitchen speaker," "car," or "BOSE speaker"). Some embodiments also promote cross-compatibility between device ecosystems by keeping track of device characteristics of devices from a plurality of different ecosystems, as described in greater detail below.

Further, in some circumstances, the target device may be used by multiple users, each of which has a separate account or sub-account with the streaming media service (e.g., different family members may have separate sub-accounts to receive their own recommendations, etc.). Some embodiments of the present disclosure modify account information for the matched device to associate the matched device with the user who provided the voice command (e.g., replacing a different user previously associated with the match device). In some circumstances, modifying the account information for the matched device allows a server system for the streaming media service to communicate directly with the matched device (e.g., rather than through the device that received the voice command).

In accordance with some embodiments, a method is performed at a first electronic device. The first electronic device includes one or more processors and memory storing instructions for execution by the one or more processors. The method includes receiving a voice command from a first user of a second electronic device. The second electronic device is distinct from the first electronic device. The method includes determining from content in the voice command: one or more characteristics of a target device; and media content to be played on the target device. The method further includes identifying, using the one or more characteristics of the target device determined from the voice command, a third electronic device that is distinct from the first electronic device and the second electronic device. The method further includes, in response to identifying the third electronic device: modifying account information for the third electronic device to associate the third electronic device with the first user; and transmitting instructions to the third electronic device to play the media content.

In some embodiments, identifying the third electronic device includes matching the one or more characteristics of the target device against characteristics of a set of candidate devices.

In some embodiments, the set of candidate devices includes devices that the first user is logged into.

In some embodiments, the set of candidate devices includes devices that the first user has previously logged into.

In some embodiments, identifying the third electronic device includes, in accordance with a determination that the one or more characteristics of the target device do not match any devices of the set of candidate devices, sending a request to the second electronic device to search for local devices.

In some embodiments, the one or more characteristics of the target device include one or more characteristics selected from the group consisting of: a name (or alias) of the target device, a brand of the target device, a type of the target device, and a model of the target device.

In some embodiments, modifying the account information for the third electronic device to associate the third electronic device with the first user includes: determining that a second user, distinct from the first user, is logged into the third electronic device; and updating, without user intervention, the account information for the third electronic device so that the first user is logged into the third electronic device.

In some embodiments, the method further includes, after playback of the media content has finished, updating, without user intervention, the account information for the third electronic device to associate the third electronic device with the second user.

In some embodiments, the method further includes, after playback of the media content has finished, maintaining the account information for the third electronic device so that the third electronic device remains associated with the first user.

In some embodiments, the voice command identifies, as the media content, a song, album, genre, podcast, or playlist.

In some embodiments, the voice command includes one or more keywords that indicate whether the media content is a song, album, genre, podcast, and/or playlist.

In some embodiments, the first user is automatically identified using the voice command.

In accordance with some embodiments, a first electronic device (e.g., a server system, a client device, etc.) includes one or more processors and memory storing one or more programs configured to be executed by the one or more processors. The one or more programs include instructions for receiving a voice command from a first user of a second electronic device. The second electronic device is distinct from the first electronic device. The one or more programs further include instructions for determining from content in the voice command: one or more characteristics of a target device; and media content to be played on the target device. The one or more programs further include instructions for identifying, using the one or more characteristics of the target device determined from the voice command, a third electronic device that is distinct from the first electronic device and the second electronic device. The one or more programs further include instructions for, in response to identifying the third electronic device: modifying account information for the third electronic device to associate the third electronic device with the first user; and transmitting instructions to the third electronic device to play the media content.

In accordance with some embodiments, a non-transitory computer-readable storage medium has stored therein instructions that, when executed by a first electronic device, cause the first electronic device to, receive a voice command from a first user of a second electronic device. The second electronic device is distinct from the first electronic device. The instructions further cause the first electronic device to determine, from content in the voice command: one or more characteristics of a target device; and media content to be played on the target device. The instructions further cause the first electronic device to identify, using the one or more characteristics of the target device determined from the voice command, a third electronic device that is distinct from the first electronic device and the second electronic device. The instructions further cause the first electronic device to, in response to identifying the third electronic device: modify account information for the third electronic device to associate the third electronic device with the first user; and transmit instructions to the third electronic device to play the media content.

In some embodiments, another method is performed at the first electronic device that includes receiving a request from the first user of the second electronic device. The method includes determining from the request: one or more characteristics of a target device and one or more actions to be performed at the target device. The method includes, in accordance with a determination that the one or more characteristics of the target device do not match any devices of a set of candidate devices associated with the user at the first electronic device, sending a request to the second electronic device to search for local devices. The method further includes matching the target device to a local device found in the search for local devices (e.g., based on and/or using the one or more characteristics of the target device identified in the request) and transmitting instructions to the third electronic device to perform the action. In accordance with some embodiments, a non-transitory computer-readable storage medium has stored therein instructions that, when executed by a first electronic device, cause the first electronic device to perform this method. In accordance with some embodiments, a first electronic device (e.g., a server system, a client device, etc.) includes one or more processors and memory storing one or more programs configured to be executed by the one or more processors. The one or more programs include instructions for performing this method.

Thus, systems are provided with improved methods for playing media content on a target device based on a voice command received at a different device.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIG. 4B illustrates an example of a payload that provides instructions to a target device to play media content, in accordance with some embodiments.

FIGS. 5A-5B are flow diagrams illustrating a method of playing media content on a target device based on a voice command received at a different device, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc., are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
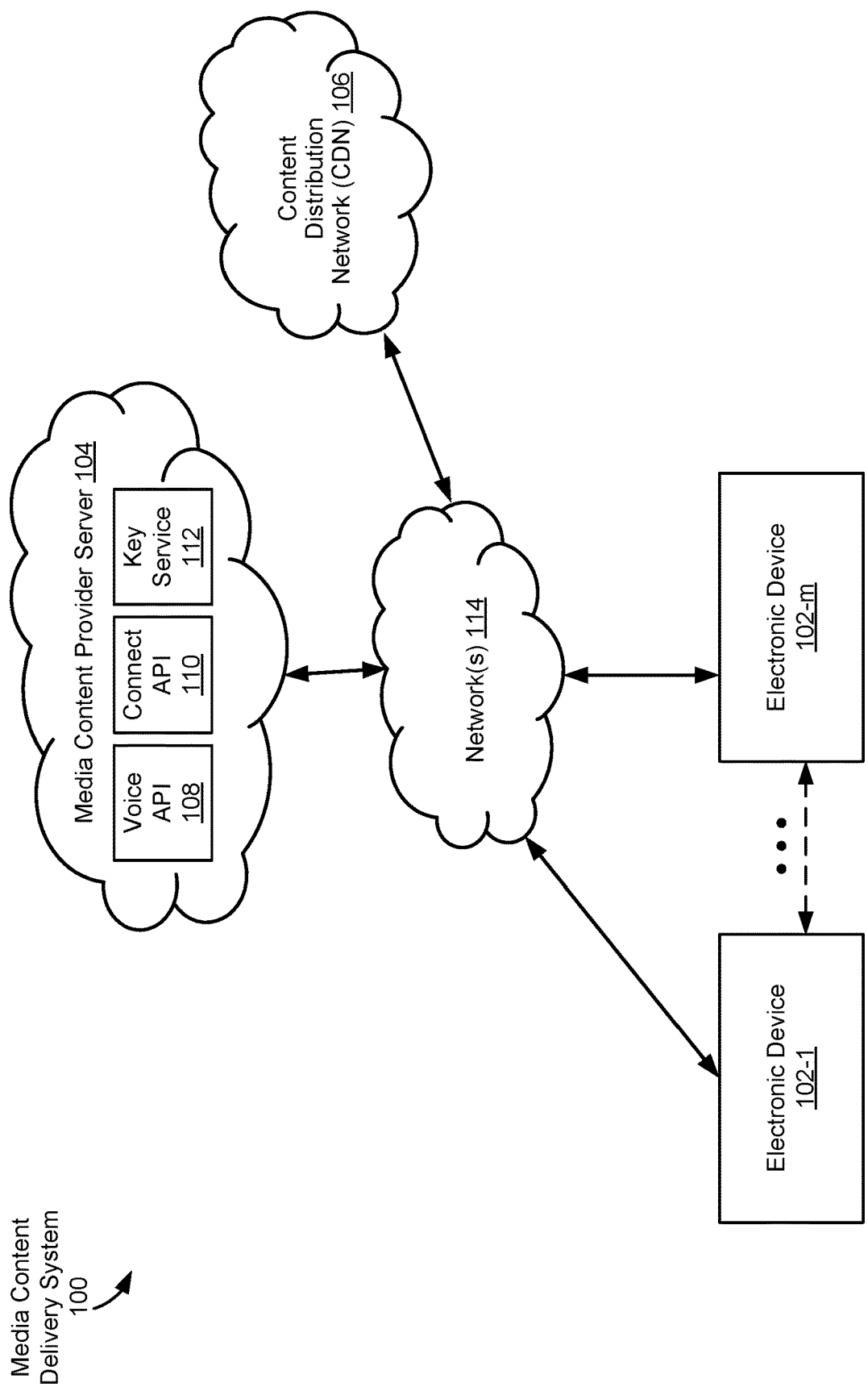
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-*m*, where m is an integer greater than one), one or more media content provider servers 104, and/or one or more content delivery networks (CDNs) 106. The one or more media content provider servers 104 are associated with (e.g., at least partially compose) a media-providing service (e.g., a streaming media service). The one or more CDNs 106 store and/or provide one or more content items (e.g., to electronic devices 102). In some embodiments, the one or more CDNs 106 are associated with the media-providing service. In some embodiments, the CDNs 106 are included in the media content provider servers 104. One or more networks 114 communicably couple the components of the media content delivery system 100. In some embodiments, the one or more networks 114 include public communication networks, private communication networks, or a combination of both public and private communication networks. For example, the one or more networks 114 can be any network (or combination of networks) such as the internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, dongle, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, electronic devices 102-1 and 102-*m* are the same type of device (e.g., electronic device 102-1 and electronic device 102-*m* are both speakers). Alternatively, electronic device 102-1 and electronic device 102-*m* include two or more different types of devices.

In some embodiments, electronic devices 102-1 and 102-*m* send and receive media-control information through network(s) 114. For example, electronic devices 102-1 and 102-*m* send media-control requests (e.g., requests to play music, movies, videos, or other media items, or playlists thereof) to media content provider server 104 through network(s) 114. Additionally, electronic devices 102-1 and 102-*m*, in some embodiments, also send indications of media content items to media content provider server 104 through network(s) 114. In some embodiments, the media content items are uploaded to electronic devices 102-1 and 102-*m* before the electronic devices forward the media content items to media content provider server 104.

In some embodiments, electronic device 102-1 communicates directly with electronic device 102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*m*. In some embodiments, electronic device 102-1 communicates with electronic device 102-*m* through network(s) 114. In some embodiments, electronic device 102-1 uses the direct connection with electronic device 102-*m* to stream content (e.g., data for media items) for playback on the electronic device 102-*m*.

In some embodiments, electronic device 102-1 and/or electronic device 102-*m* include a media application 222 (FIG. 2) that allows a respective user of the respective electronic device to upload (e.g., to media content provider server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content provider server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 114. Media content (also referred to herein as "media items," "media content items," and "content items") is received, stored, and/or served by the CDN 106. In some embodiments, media content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content provider server 104 receives media requests (e.g., commands) from electronic devices 102. In some embodiments, media content provider server 104 includes a voice API 108 (e.g., voice recognition module 316, FIG. 3), a connect API 110 (e.g., network communication module 312, FIG. 3), and/or key service 112 (e.g., key database 336, FIG. 3). In some embodiments, media content provider server 104 validates (e.g., using key service) electronic devices 102 by exchanging one or more keys (e.g., tokens) with electronic device(s) 102.

In some embodiments, media content provider server 104 and/or CDN 106 stores one or more playlists (e.g., information indicating a set of media content items). For example, a playlist is a set of media content items defined by a user and/or defined by an editor associated with a media-providing service. The description of the media content provider server 104 as a "server" is intended as a functional description of the devices, systems, processor cores, and/or other components that provide the functionality attributed to the media content provider server 104. It will be understood that the media content provider server 104 may be a single server computer, or may be multiple server computers. Moreover, the media content provider server 104 may be coupled to CDN 106 and/or other servers and/or server systems, or other devices, such as other client devices, databases, content delivery networks (e.g., peer-to-peer networks), network caches, and the like. In some embodiments, the media content provider server 104 is implemented by multiple computing devices working together to perform the actions of a server system (e.g., cloud computing).

Figure 2:
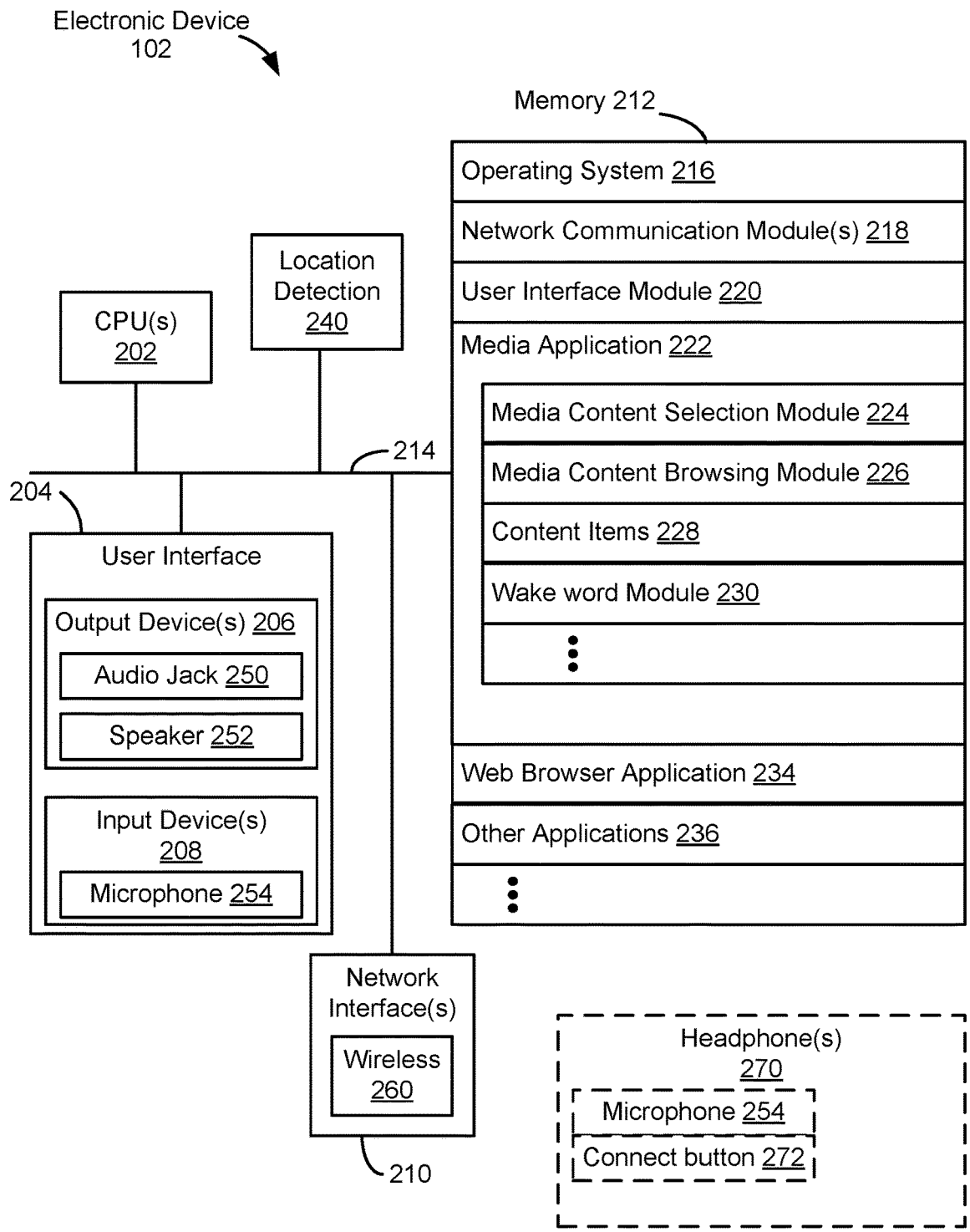
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad (e.g., which include one or more physical buttons). Alternatively, or in addition, in some embodiments, the user interface 204 includes a display device. In some embodiments, the display device includes a touch-sensitive surface, in which case the display device is a touch-sensitive display (e.g., a touch screen). In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. In some embodiments, the electronic device 102 includes an audio input device (e.g., a microphone 254) to capture audio (e.g., speech from a user).

In some embodiments, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content provider server 104, a CDN 106, and/or other devices or systems. In some embodiments, data communications are carried out using any of a variety of custom or standard wireless protocols (e.g., NFC, RFID, IEEE 802.15.4, WI-FI, ZIGBEE, 6LOWPAN, THREAD, Z-WAVE, BLUETOOTH, ISA100.11A, WIRELESSHART, MIWI, etc.). Furthermore, in some embodiments, data communications are carried out using any of a variety of custom or standard wired protocols (e.g., USB, FIREWIRE, ETHERNET, etc.). For example, the one or more network interfaces 210 include a wireless interface 260 for enabling wireless data communications with other electronic devices 102, and/or or other wireless (e.g., BLUETOOTH-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content provider server 104 (via the one or more network(s) 114, FIG. 1).

In some embodiments, electronic device 102 includes one or more sensors including, but not limited to, accelerometers, gyroscopes, compasses, magnetometers, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the electronic device 102 to other computing devices (e.g., other electronic device(s) 102, and/or media content provider server 104) via the one or more network interface(s) 210 (wired or wireless) connected to one or more network(s) 114;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content provider server 104) for uploading, browsing, receiving, processing, presenting, and/or requesting playback of media content (e.g., media items). In some embodiments, media application 222 includes a media player, a streaming media application, and/or any other appropriate application or component of an application. In some embodiments, media application 222 is used to monitor, store, and/or transmit (e.g., to media content provider server 104) data associated with user behavior. In some embodiments, media application 222 also includes the following modules (or sets of instructions), or a subset or superset thereof:

a media content selection module 224 for selecting one or more media content items and/or sending, to the media content provider server, an indication of the selected media content item(s);

a media content browsing module 226 for providing controls and/or user interfaces enabling a user to navigate, select for playback, and otherwise control or interact with media content, whether the media content is stored or played locally or remotely;

a content items module 228 for processing uploaded media items and storing media items for playback and/or for forwarding to the media content provider server;

a wake word module 230 for determining whether a wake word has been received at the electronic device, the wake word used to identify a voice command (e.g., an utterance) that follows the wake word (e.g., after the wake word is received, the electronic device records additional voice commands);

a web browser application 234 (e.g., INTERNET EXPLORER or EDGE by MICROSOFT, FIREFOX by MOZILLA, SAFARI by APPLE, and/or CHROME by GOOGLE) for accessing, viewing, and/or interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, electronic device 102 includes or is coupled with (e.g., communicatively-coupled with, either wired or wirelessly) headphones 270 (or another speaker/display device). In some embodiments, headphones 270 are communicatively coupled with electronic device 102 through audio jack 250. Electronic device 102 optionally includes a microphone 254 (e.g., analogous to microphone 254 described above).

In some embodiments, headphones 270 include a connect button 272. In some embodiments, connect button 272 is a dedicated button (e.g., hotkey button) on headphones 270 associated with a streaming media service (e.g., media content provider server 104, FIG. 1). In some embodiments, activation of the connect button 272 triggers playback of media content using the streaming media service through the electronic device 102. For example, the electronic device 102 is logged into the streaming media service through an application connected to and logged into media content provider server 104, FIG. 1. In some embodiments, the application that is connected to and logged into the streaming media service is woken up from the background of electronic device 102 in response to activation of the connect button 272. In some embodiments, in response to activation of the connect button 272, the electronic device 102 initiates playback of media content from the streaming media service. For example, the electronic device 102 initiates playback of default media content (e.g., media content that was last played or the user's top hits). In some embodiments, activation of the connect button 272 activates microphone 254 on headphones 270 and allows the streaming media service to begin listening for voice commands (e.g., through the application, as an alternative to the user speaking a wake word).

In some embodiments, in response to activation of the connect button 272, the electronic device 102 retrieves metadata from the headphones 270. In some embodiments, the metadata includes one or more characteristics of the headphones 270 (e.g., a brand, model, device ID). In some embodiments, the metadata is provided to the streaming media service (media content provider server 104, FIG. 1). In some embodiments, in response to receiving the metadata for the headphones 270, the streaming media service associates the headphones 270 with the user whose account is logged in on the electronic device 102 (e.g., stores the headphones 270 as logged into the user's account in connect state 412, FIG. 4A).

Although the description above refers to a connect button 272 on headphones 270, one of skill in the art having the benefit of this disclosure will recognize that an analogous connect button 272 could be included on any speaker system and/or display device (e.g., any output device for a streaming media service).

Figure 3:
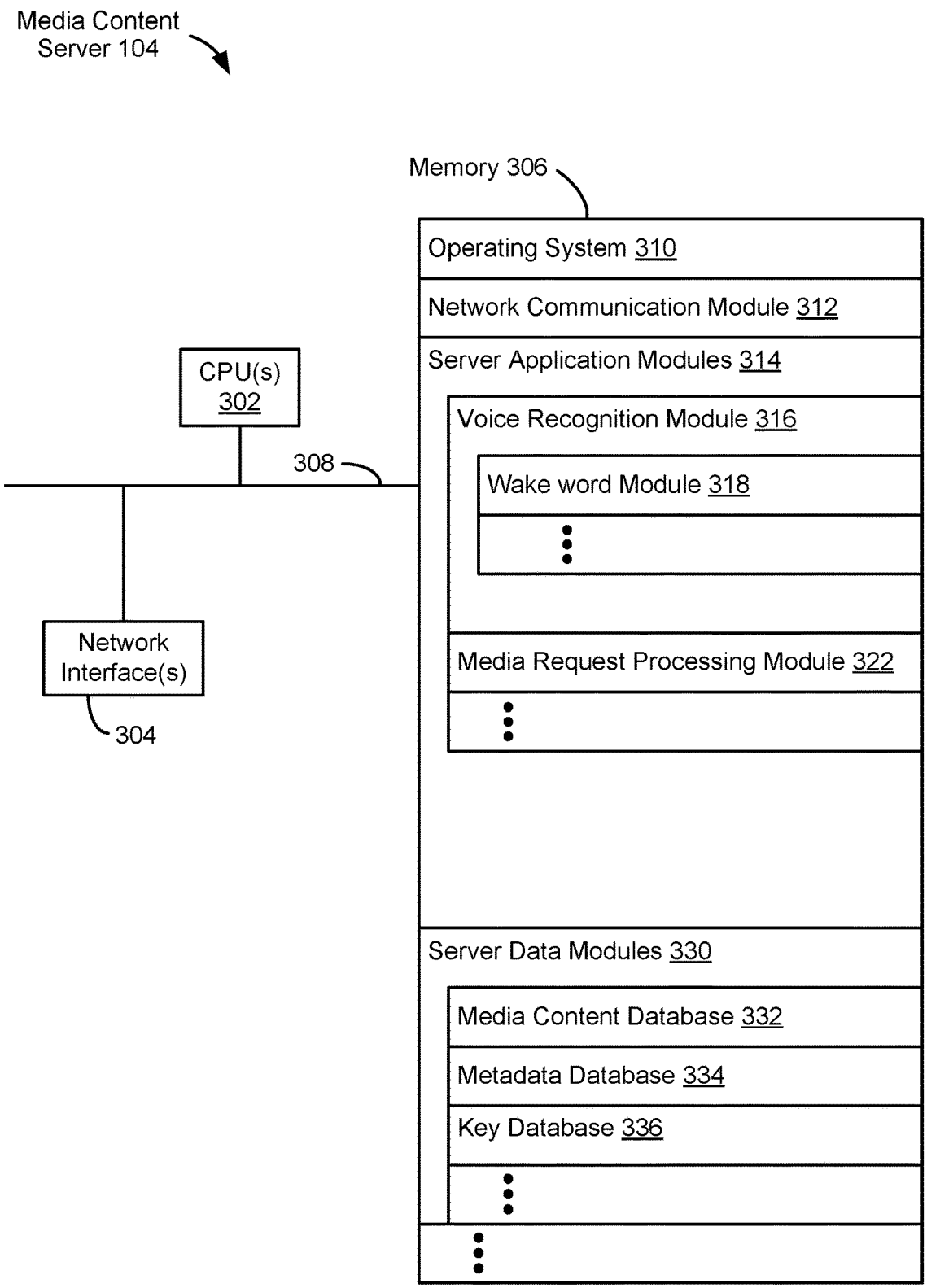
FIG. 3 is a block diagram illustrating a media content provider server, in accordance with some embodiments.

FIG. 3 is a block diagram illustrating a media content provider server 104, in accordance with some embodiments. The media content provider server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content provider server 104 to other computing devices via one or more network interfaces 304 (wired or wireless) connected to one or more networks 114;

one or more server application modules 314 for performing various functions with respect to providing and managing a content service, the server application modules 314 including, but not limited to, one or more of:

a voice recognition module 316 (e.g., executed as Voice API 108, FIGS. 1 and 4-5) for identifying and/or interpreting one or more voice commands received at an electronic device, the voice recognition module 316 including, but not limited to, one or more of:

a wake word module 318 for verifying or determining whether a wake word has been received at the client electronic device (e.g., electronic device 102-1), the wake word used to identify a voice command (e.g., an utterance) that follows the wake word (e.g., after the wake word is received, the electronic device records additional voice commands); and a media request processing module 322 for processing requests for media content and facilitating access to requested media items by electronic devices (e.g., the electronic device 102) including, optionally, streaming media content to such devices;

one or more server data module(s) 330 for handling the storage of and/or access to media items and/or metadata relating to the media items; in some embodiments, the one or more server data module(s) 330 include:

media content database 332 for storing media items;

a metadata database 334 for storing metadata relating to the media items; and a key database 336 for storing keys that decrypt media content received from a content distribution network.

In some embodiments, the media content provider server 104 includes web or Hypertext Transfer Protocol Secure (HTTPS) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content provider server 104 in accordance with some embodiments, FIG. 3 is intended more as a functional description of the various features that may be present in one or more media content provider servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content provider server 104. The actual number of servers used to implement the media content provider server 104, and how features are allocated among them, will vary from one implementation to another and, optionally, depends in part on the amount of data traffic that the server system handles during peak usage periods as well as during average usage periods.

Figure 4A:
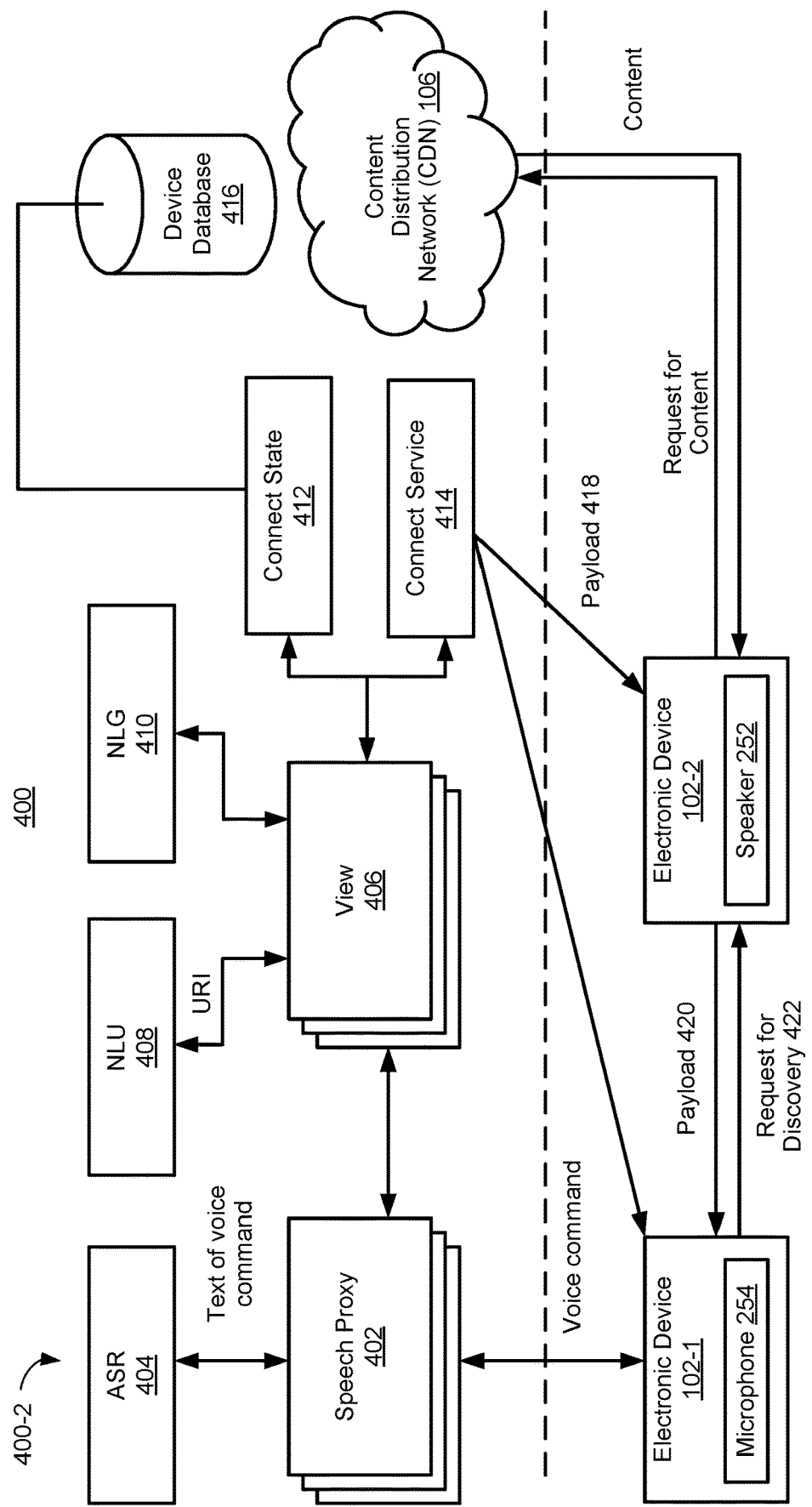
FIG. 4A is a block diagram illustrating a system architecture for playing media content on a target device based on a voice command received at a different device, in accordance with some embodiments.

FIG. 4A is a block diagram illustrating a system architecture 400 for playing media content on a target device based on a voice command received at a different device, in accordance with some embodiments. Note that the target device may represent a group of devices (e.g, a group of speakers or two or more devices having different device types, for example, a speaker, television, and gaming console). For ease of explanation, system architecture is divided between a client portion 400-1 and a server portion 400-2.

In some embodiments, client portion 400-1 includes a plurality of electronic devices 102 (e.g., client devices). For example, the client portion 400-1 of system architecture 400 includes a first electronic device 102-1 that includes a microphone 254 and a second electronic device 102-2, distinct from first electronic device 102-1, that includes a speaker. As described below, in some circumstances, first electronic device 102-1 receives a voice command from a user that identifies the second electronic device 102-2 as a target device on which to play media content. For example, first electronic device 102-1 may be a voice assistant device and second electronic device 102-2 may be a kitchen speaker. Alternatively, first electronic device 102-1 may be a portable multifunction device (e.g., a smart phone) and second electronic device 102-2 may be integrated into the user's car (e.g., as part of the car's console, stereo, infotainment system). In some embodiments, the user is automatically identified using the voice command (e.g., using voice identification). Automatically identifying a user using a voice command allows a user to control the device efficiently (e.g., without having to navigate through a graphical user interface in order to provide input indicating the user's identity).

In some embodiments, first electronic device 102-1 provides the voice command to a speech proxy 402 on the server portion 400-2. The speech proxy 402 is a server system or application on a server system that acts as an intermediary for voice commands from client device (e.g., first electronic device 102-1) by receiving voice commands from users of client devices. The speech proxy 402 provides the voice commands to an automatic speech recognition (ASR) service 404 (e.g., which may be a server system or an application on a server system). The ASR service 404 converts (e.g., translates) the voice command to text (e.g., a text string) and returns the text string to the speech proxy 402. In some embodiments, speech proxy 402 is a component of voice API 108 (FIG. 1).

Note that, in some circumstances, speech proxy 402 may be part of a server system that belongs to or is operated by a streaming media service (e.g., media content provider server 104, FIG. 1), whereas ASR service 404 may be operated by a third-party or combination of parties, although this need not be the case. In addition, system architecture 400 may include a plurality of speech proxies 402, where each speech proxy of the plurality of speech proxies 402 corresponds to a different product operated by the streaming media service. For example, the streaming media service may support one or more smart-phone applications, a voice assistant application, a car-based application, etc. Each of these applications may comprise a separate product with its own speech proxy 402. Providing multiple speech proxies that correspond to various products operated by a streaming media service enables customization of each speech proxy to the context of a particular application.

In some embodiments, the speech proxy 402 passes the text of the voice command to view 406. View 406 provides a proxy for other services, such as natural language understanding (NLU) service 408, natural language generator (NLG) service 410, connect state service 412, and connect service 414. Some of these services, such as NLU service 408 and NLG service 410 may be operated by third-parties (e.g., distinct and separate from the streaming media service), although this need not be the case. In some embodiments, system architecture 400 includes a plurality of views 406, where each view in the plurality of views corresponds to a different product. Providing multiple views that correspond to various products operated by a streaming media service enables customization of each view to the context of a particular application. In addition to providing a proxy for other services, in some embodiments, the one or more views 406 also act as a payload decorator by supplementing and/or truncating payloads received from other services based on the product corresponding to the view (e.g., a view for a car-based product may provide a different payload to the car-based product as compared to the payload provided to a smart-phone by a view for the smart-phone based product). For example, view 406 finalizes a payload 418 which is provided to the target device (e.g., second electronic device 102-2) through the connect service 414. Example payloads 418 are described in relation to FIGS. 4B and 4C.

In some embodiments, view 406 determines, from content in the voice command (e.g., from the text produced by the ASR 404), one or more characteristics of a target device (e.g., a name, type, brand, or model of the target device) and media content (e.g., a song, playlist, or album) to be played on the target device. In some embodiments, determining the one or more characteristics of the target device and the media content comprises providing a version of the voice command (e.g., the text of the voice command) to NLU 408, which provides at least partial fulfillment of the request by parsing the voice command to determine the one or more characteristics of the target device and the media content (e.g., by performing one or more searches of known characteristics of devices and/or known media content). Providing a version of a voice command to an NLU service to determine one or more characteristics of the target device and the media content increases the efficiency with which the characteristics are determined (e.g., by allowing the characteristics to be determined without requiring user navigation through a graphical user interface and provision of input indicating a target device and requested media content). In some embodiments, determining the one or more characteristics of the target device and the media content comprises receiving a response from the NLU 408. In some embodiments, the response comprises a uniform resource identifier (URI) for the requested content.

In some embodiments, view 406 provides the determined one or more characteristics of the target device to connect state service 412, which identifies, if possible, using the one or more characteristics of the target device determined from the voice command, a second electronic device 102-2 as the target device. In some embodiments, identifying the target device includes matching one or more characteristics of the target device against characteristics of a set of candidate devices (e.g., stored in device database 416). For example, device database 416 stores a data structure (e.g., a table) that includes one or more devices, identified using a unique device identifier, that the user (who provided the voice command) is logged into and/or one or more devices that the user has previously been logged into. In some embodiments, device database 416 stores, in the data structure, characteristics of each of the devices associated with the user (e.g., a model of the device, a brand of the device, a type of the device, etc.). In some embodiments, the device database 416 stores a plurality of devices for a second user, including devices from two or more distinct device ecosystems (e.g., AMAZON ECHO, GOOGLE CHROMECAST, etc.). The connect state service 412 identifies the second electronic device 102-2 as the target device by matching the one or more characteristics from the voice command to the characteristics of the second electronic device 102-2. In some embodiments, device database 416 stores, in the data structure, one or more user-assigned names and/or terms that correspond to the user-assigned names. For example, connect state service 412 matches the word "kitchen" in the phrase "play Today's Top Hits in the kitchen" to a unique device identifier for a respective speaker (e.g., by matching the word "kitchen" to a device's friendly name "Kitchen Speaker"). In some embodiments, connect state service 412 matches the term "kitchen speaker" in the phrase "play Today's Top Hits on the kitchen speaker" to the same unique device identifier by matching the term "kitchen speaker" to the device's friendly name "Kitchen Speaker." Storing characteristics of devices associated with a user allows architecture 400 to process voice commands directed to target devices in different ecosystems. This increases the efficiency with which a user is able to access target devices in the different ecosystems (e.g., by allowing the user to access a device by referencing a characteristic of the device rather than needing to provide input at the device in order to determine its identifying information).

In some embodiments, connect state service 412 informs view 406 of the identity of the target device (e.g., the second electronic device 102-2). In some embodiments, view 406 communicates with NLG service 410 to determine an appropriate speech response to provide to the user. For example, in response to a voice command "Play my top picks in the kitchen," the view 406, in conjunction with NLG service 410, may determine that a proper speech response is "Playing your top hits on the kitchen speaker" (e.g., assuming that connect state service 412 has matched "the kitchen" to an existing "kitchen speaker"). On the other hand, in response to a voice command "Play Madonna in the kitchen," the view 406, in conjunction with NLG service 410, may determine that a proper speech response is a verbal prompt, asking "Do you want to hear the album Madonna or the artist Madonna?" Note that the speech response may be provided to the target device (e.g., the kitchen speaker) or the device that received the voice command. The view 406 then provides a payload to connect service 414, which controls the target device (e.g., second electronic device) (e.g., directly controls) by transmitting instructions to the target device to play the media content. In some embodiments, transmitting instructions to the target device to play the media content includes providing the URI for the media content to the target device so that the target device can obtain the media content from CDN 106. In some embodiments, connect service 414 is a component of connect API 110 (FIG. 1).

In some embodiments, when the one or more characteristics of the target device cannot be matched to any of the candidate devices associated with the user (e.g., devices that the user is currently and/or has previously been logged into), the server portion 400-2 transmits instructions back to the device that received the voice command to search for additional local devices (e.g., local to the client portion 400-1 and/or local to the device that recorded the voice command). In some embodiments, local devices are devices that are connected to the same local area network (LAN). In some embodiments, the instructions to search for additional local devices comprise or consist of information (e.g., a payload) indicating that the one or more characteristics of the target device cannot be matched to any of the candidate devices associated with the user. For example, when the first electronic device 102-1 receives a voice command requesting that media content be played at a target device, and the server portion 400-2 cannot match the target device to a device associated with the user of the first electronic device 102-1 (e.g., using information already stored in device database 416), the server system sends a payload back to the electronic device 102-1 indicating a lack of a match (e.g., the payload is provided through speech proxy 402). In response to receiving the payload indicating the lack of a match, the electronic device 102-1 searches for local devices (e.g., the electronic device 102-1 initiates a local discovery process). In response to the instructions to perform a local discovery process, the first electronic device 102-1 transmits a request for discovery 422 to local devices (e.g., using ZEROCONF over a local area network, DIAL, CAST, or BLUETOOTH). In some embodiments, local devices responding to the request return a payload 420 (described in greater detail with reference to FIG. 4C) that includes one or more characteristics of the locally-discovered device (e.g., brand, model, device type, device name). Searching for local devices in accordance with a determination that a target device cannot be matched to a device associated with a user increases the efficiency with which a target device is determined (by automatically initiating a search for a local device rather than requiring user input to initiate a search for a local device when a match is not found).

In some embodiments, a local search (as described above) is performed periodically (e.g., once a minute). In some embodiments, local devices are discovered when the user activates connect button 272, described with reference to FIG. 2. In some embodiments, locally-discovered devices are automatically registered with (e.g., associated with) the user of the second electronic device (e.g., the device that performed the local search). For example, locally-discovered devices are associated with the user of the second electronic device in device database 416 (FIG. 4A).

In some embodiments, using the locally discovered additional devices, an attempt is made (e.g., either on the client portion 400-1 or the server portion 400-2) to match characteristics of the additional local devices to the one or more characteristics of the target device identified from the voice command. In some embodiments, the attempt to match the additional local devices to the target device is performed automatically, without user intervention. Matching additional local devices automatically, without user intervention reduces the amount of user input required to match the additional local devices to the target device, which in turn reduces processing power required to match the additional local devices to the target device.

In some embodiments, any of the components described above as being part of the server portion 400-2 of the system architecture 400 may be components of media content provider server 104 (FIG. 1). In some embodiments, various components, such as ASR service 404, NLU service 408, NLG service 410, and CDN 106, may be separate from media content provider server 104 (FIG. 1) (e.g., may be operated by a third-party).

FIG. 4B illustrates an example of a payload 418 that provides instructions to a target (e.g., playback) device to play the media content, in accordance with some embodiments. In some embodiments, the payload 418 includes one or more of:

text information 421 to be displayed in a user interface of the target device (e.g. as the media content is being played back) (e.g., a title and subtitle);

image information 424 to be displayed in a user interface of the target device (e.g. as the media content is being played back). In some embodiments, the image information 424 includes a URI to an image (e.g., an album cover);

target information 426 (e.g. a URI to the media content to be played back); and custom information 428, including for example, a text-to-speech prompt to be provided by the target device, information identifying the target device (e.g., playBackDevice), information identifying an action to be taken by the target device (e.g., intent) and, optionally, a text string of the original query.

Figure 4C:
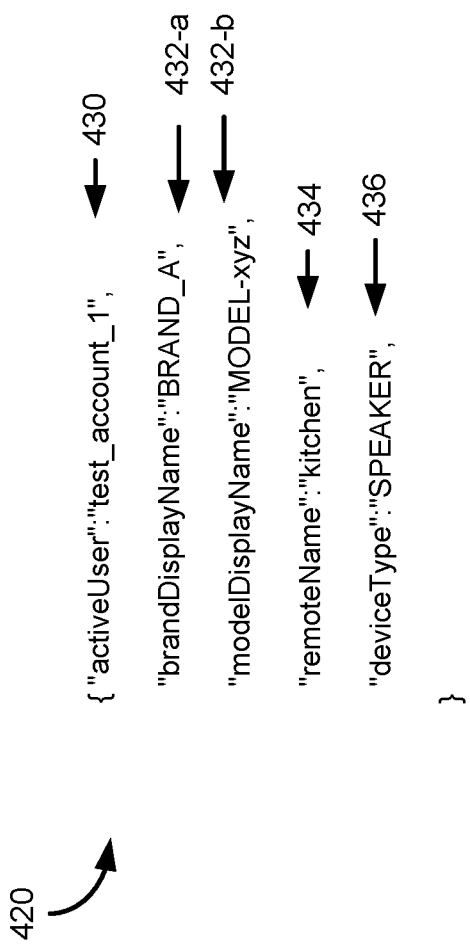
FIG. 4C illustrates an example of a payload provided by an electronic device in response to a search for local devices, in accordance with some embodiments.

FIG. 4C illustrates an example of a payload 420 provided by an electronic device in response to a search for local devices, in accordance with some embodiments. The payload 420 identifies characteristics of the electronic device. For example, the payload 420 includes one or more of:

active user information 430 indicating an active user who is logged into or paired with the discovered electronic device;

brand and model information 432 (e.g. brandDisplayName 432-a and modelDisplayName 432-b) that identifies a brand and model of the discovered electronic device (e.g., as set by the manufacturer);

remoteName 434 (e.g., a friendly name assigned and/or set by the user); and device type information 436 that identifies a device type of the discovered electronic device (e.g. a speaker, computer, phone, television, car, game console, dongle, headphones).

Figure 5B:
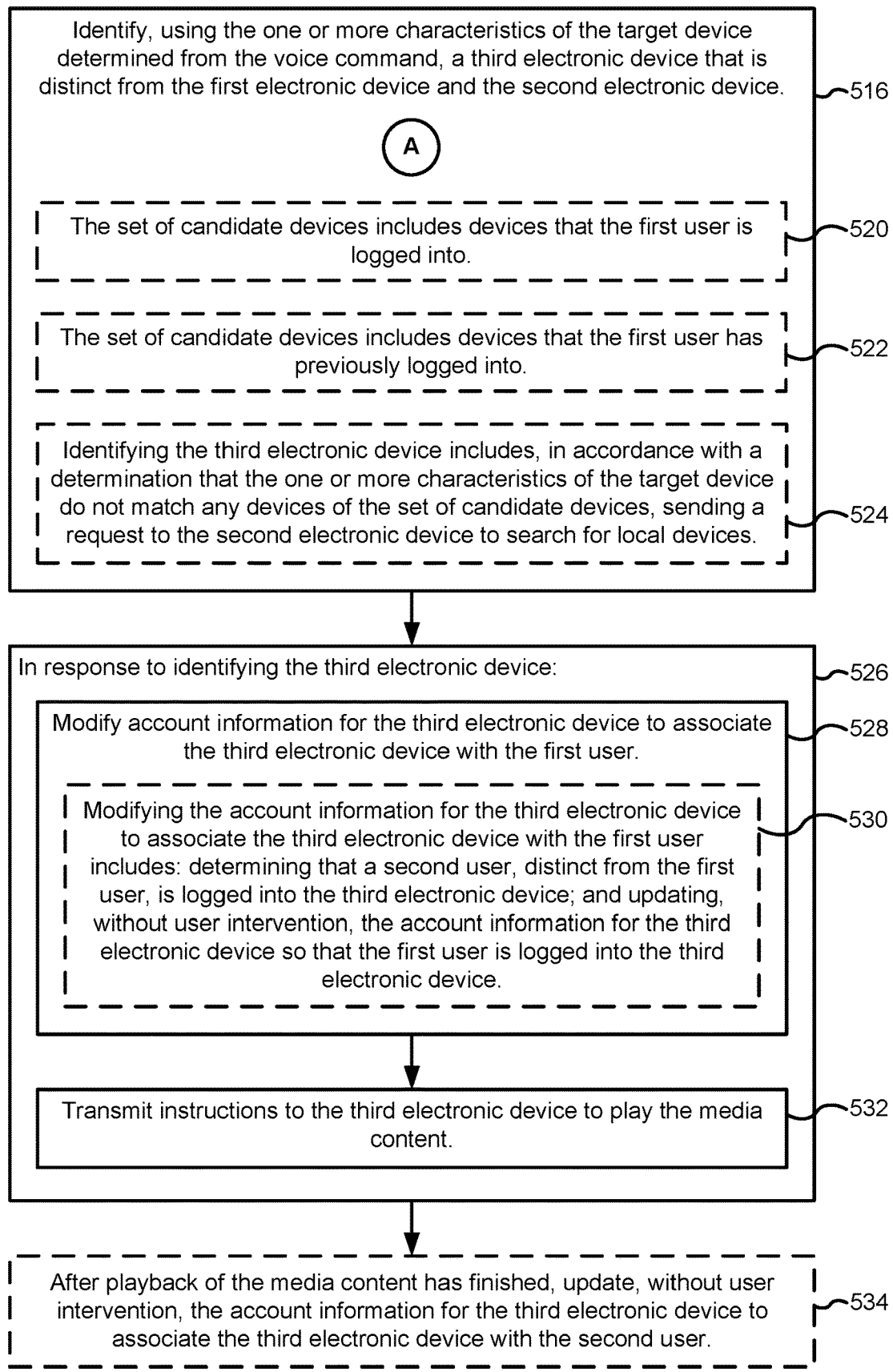

FIGS. 5A-5B are flow diagrams illustrating a method of playing media content on a target device based on a voice command received at a different device, in accordance with some embodiments. Method 500 may be performed (502) at a first electronic device (e.g., media content provider server 104), the first electronic device having one or more processors and memory storing instructions for execution by the one or more processors. In some embodiments, the method 500 is performed by executing instructions stored in the memory (e.g., memory 306, FIG. 3) of the first electronic device. In some embodiments, the method 500 is performed by a combination of the server system (e.g., including media content provider server 104 and/or CDN 106) and a client device (e.g., electronic device 102-1).

In some circumstances, a user may provide a voice command, such as "Play Today's Top Hits in the kitchen," to his or her mobile phone. The voice command may be directed to a streaming media service with which the user has an account. In some embodiments, method 500 includes determining (e.g., at the cloud) from the voice command, characteristics of a target device (e.g., in this case, a speaker in the kitchen) as well as content to be played (e.g., in this case, Today's Top Hits). The characteristics of the target device (e.g., a name of the target device, a brand of the target device, device type, and/or a model of the target device) are matched to a device that is associated with the user (e.g., a speaker device that the user is logged into, is connected with, has previously been logged into, or has previously been connected with). In some circumstances, the match can be a soft or partial match. For example, some embodiments will match "Play Today's Top Hits in the kitchen" to a device named (e.g., by the user) "Kitchen Speaker." In some embodiments, playback devices (e.g., target devices) from different ecosystems can be associated with the same user using the target devices' characteristics, so that the user can trigger playback of content at an AMAZON ECHO device or a GOOGLE CHROMECAST. Method 500 thus improves the computer itself by increasing the extent and ease of connectivity between devices, which increases device utility and saves battery power by streamlining user interactions with electronic devices.

Thus, method 500 provides technical advantages and improves the client and server computers described herein by simplifying the user-machine interface as it relates to accessing and controlling remote devices. More particularly, by matching a target device based on characteristics identified in a voice command, the method 500 reduces the friction involved in accessing and controlling a remote device (e.g., the user need not navigate to an obscure setting interface on his or her device, or remember a peculiar "friendly name," but instead can, by voice, refer to, e.g., his or her "kitchen speaker," "car," or "BOSE speaker"). As noted above, some embodiments of method 500 also promote cross-compatibility between device ecosystems by keeping track of device characteristics of devices from a plurality of different ecosystems.

Referring now to FIG. 5A, in performing the method 500, the first electronic device receives (504) a voice command from a first user of a second electronic device. For example, in some embodiments, the voice command is recorded by the second electronic device (e.g., a client device) and transmitted to the first electronic device (e.g., a server device). The second electronic device is distinct from the first electronic device. For example, the second electronic device is a server system and the first electronic device is a client device in communication with the server system (e.g. having an application logged into a service provided by the server system). In some embodiments, the voice command is received over the internet.

In some embodiments, the first user is (506) automatically identified using the voice command (e.g., the speaker is identified using content in the voice command). Identifying a user automatically using a voice command increases the efficiency with which a user is identified (e.g., by eliminating the need for a graphical user interface to be displayed to a user in order for the user to provide input indicating the user identity). In some embodiments, identifying the speaker includes using one or more of frequency estimation, hidden Markov models, Gaussian mixture models, pattern matching algorithms, neural networks, matrix representation, vector quantization and/or decision trees.

The first electronic device determines (508) from content in the voice command: one or more characteristics of a target device; and media content to be played on the target device. For example, the voice command may state, "Play Today's Top Hits in the kitchen." From the voice command, the first electronic device determines that the user's intent is to play media content, that the media content is "Today's Top Hits," and that a characteristic of the target device is the "kitchen," which may be matched to a name (e.g., a friendly name) of the target device, as described below. More generally, the first electronic device determines, from the content in the voice command, one or more characteristics of a target device and an action to be performed by the target device. In some embodiments, the action relates to media content. In some embodiments, the media content is identified in the voice command. As several examples, the user's intent, as determined from content in the voice command, is to transfer media content (e.g., "Transfer the album Today's Top Hits to the kitchen assistant"), pause media (e.g., "Pause the music in the kitchen"), advance to subsequent media content (e.g., "Skip to the next track in the kitchen"), or advance or retreat playback position in the media content (e.g., "Jump forward 30 seconds in the kitchen").

In some embodiments, the one or more characteristics of the target device include (510) one or more characteristics selected from the group consisting of: a name of the target device, a brand of the target device, and a model of the target device. For example, the voice command may state "Play Today's Top Hits on my BOSE speaker" (e.g., identifying the brand of the target device), or "Play Today's Top Hits on my SOUNDLINK speaker" (e.g., identifying a model of the target device), or "Play Today's Top Hits on Dave's first speaker." In some embodiments, a plurality of characteristics of the target device is identified from the voice command. For example, the voice command may state "Play Today's Top Hits on my BOSE SOUNDLINK speaker" (e.g., identifying the brand and model of the target device). In some embodiments, the one or more characteristics of the target device include a device type (e.g., a speaker, headphones, display, dongle).

In some embodiments, the voice command identifies (512), as the media content, a song, album, genre, podcast, or playlist. For example, the voice command identifies one or more media content items, such as: a single media content item, a playlist of media content items, a listening session (e.g., including a series of media content items selected by input provided by the first user), an album, or a "station" that includes multiple content items determined based on an artist, a particular media content item, and/or a genre. For example, the voice command may state "Play Like a Prayer in the kitchen" (identifying the song); or "Play the album Madonna on my BOSE speaker" (e.g., identifying the album), or "Play the artist Madonna on my SOUNDLINK speaker" (e.g., identifying the artist), or "Play Jazz in the kitchen" (identifying the genre), or "Play my top hits in the kitchen" (e.g., identifying a personalized playlist corresponding to the user).

In some embodiments, the voice command includes (514) one or more keywords that indicate whether the media content is a song, album, genre, podcast, and/or playlist. For example, the voice command may specify "Play the album Madonna in the kitchen" or "Play the artist Madonna in the kitchen" to disambiguate between the album and the artist Madonna. In some embodiments, when there is ambiguity in the voice command as to whether the desired media content is a song, album, genre, podcast, and/or playlist, the method 500 includes prompting the user to specify whether the media content is a song, album, genre, and/or playlist.

The first electronic device identifies (516), using the one or more characteristics of the target device determined from the voice command, a third electronic device that is distinct from the first electronic device and the second electronic device (e.g., matches the target device to a third electronic device). For example, in some embodiments, identifying the third electronic device includes (518) matching the one or more characteristics of the target device against characteristics of a set of candidate devices (e.g., to identify a respective candidate of the set of candidate device as the target device). Automatically identifying an an electronic device by matching one or more characteristics of the target device against characteristics of a set of candidate devices, without requiring user input to indicate the identification of the electronic device, increases the efficiency with which an electronic device is identified. In some embodiments, the set of candidate device comprises the devices associated with the first user in table stored in device database 416, FIG. 4A. Storing a data structure (e.g., a table) that associates characteristics of candidate devices with particular users, and using the data structure to match a voice command to a target device increases cross-compatibility between ecosystems, e.g., by providing a cloud-based ecosystem-neutral way to refer to a target device.

In some embodiments, the match does not need to be a perfect match (e.g., may be an inexact or soft match). For example, from the voice command "Play Today's Top Hits in the kitchen," the first electronic device may identify a device having a friendly name (or an alias) "kitchen speaker" as the target device. In some embodiments, a plurality of identifiers are stored in association with the third device. For example, the first electronic device accesses a stored data structure (e.g., one or more tables in device database 416, FIG. 4A) that includes the plurality of identifiers stored in association with the third electronic device (e.g., in the database, a unique identifier for the third electronic device is linked to the plurality of identifiers). In this way, when a user provides a voice command indicating a song to be played "in the kitchen," a lookup may be performed for identifiers in the plurality of identifiers (e.g., "kitchen") that correspond to "kitchen speaker"). Enabling a device to be identified using an inexact match between one or more characteristics of the target device and characteristics of a set of candidate devices improves the human machine interface by allowing access to a target device without requiring a user to access the device in order to determine precise identifying information for the device.

Note that, in some embodiments or circumstances, the third electronic device and the second electronic device may not be distinct. For example, the third electronic device and the second electronic device may be the same device.

Referring now to FIG. 5B, in some embodiments, the set of candidate devices includes (520) devices that the first user is logged into. In some embodiments, the set of candidate devices includes (522) devices that the first user has previously logged into (e.g., but is not currently logged into). In some embodiments, identifying the third electronic device includes (524), in accordance with a determination that the one or more characteristics of the target device do not match any devices of the set of candidate devices (e.g., stored on the cloud), sending a request to the second electronic device to search for local devices (e.g., over LAN using ZEROCONF, DIAL, or CAST, or a similar protocol). As noted above with reference to FIG. 4C, the request may comprise or consist of information (e.g., a payload) indicating that the one or more characteristics of the target device do not match any devices of the set of candidate devices (e.g., as used herein, the term request should be construed broadly to include a payload indicating that the one or more characteristics of the target device do not match any devices of the set of candidate devices, where the device that receives the payload initiates a search for local devices in response to receiving the payload indicating that the one or more characteristics of the target device do not match any devices of the set of candidate devices). In some embodiments, in response to receiving the information indicating that the one or more characteristics of the target device do not match any devices of the set of candidate devices, the second electronic device initiates the search for local devices (e.g., initiates the local discovery process).

In response to identifying the third electronic device (526), the first electronic device modifies (528) account information for the third electronic device to associate the third electronic device with the first user.

In some embodiments, modifying the account information of the third electronic device allows the first electronic device to communicate directly with (and control) the third electronic device. In some embodiments, modifying the account information of the third electronic device allows the first electronic device to update a preference profile of the first user based on the media content determined from the voice command, and to provide subsequent media content to the third electronic device based on the updated preference profile of the first user.

Further, modifying account information for the target device seamlessly allows multiple users to target the same devices, without the risk of account contamination (e.g., with respect to recommendations and preference profiles), particularly for embodiments in which the cloud communicates directly with the target device in response to the voice command. Modifying account information stored by a device to associate a device with a user improves the ability of the device to provide recommendations to a user (e.g. by associating requested content with the user's account and avoiding associated content requested by a first user with the account of a different user), which, in turn, reduces the amount of input required to obtain content (by providing the user with recommended content without requiring the user to provide input to obtain desired content). Reducing the amount of input required to obtain content improved the user-machine interface and reduces the processing requirements of the device.

In some embodiments, modifying the account information for the third electronic device to associate the third electronic device with the first user includes (530) determining that a second user, distinct from the first user, is logged into the third electronic device; and updating, without user intervention, the account information for the third electronic device so that the first user is associated with (e.g., logged into) the third electronic device (e.g., instead of the second user). In some embodiments, modifying the account information for the third electronic device is performed in accordance with the determination that the second user is logged into the third electronic device. In some embodiments, updating the account information for the third electronic device includes associating the third electronic device with the first user in a table (e.g., stored in device database 416, FIG. 4). In some embodiments, updating the account information for the third electronic device includes disassociating the third electronic device with the second user in the table or database. In some embodiments, the third electronic device is associated with only a single user at one time. Modifying the account information for the third electronic device thus improves the first electronic device (e.g., the server system) by seamlessly allowing multiple users to target the same devices, without the risk of account contamination (e.g., with respect to recommendations and preference profiles), particularly for embodiments in which the cloud communicates directly with the target device in response to the voice command (e.g., as described with respect to FIG. 4A). That is, modifying the account information for the third electronic device prevents contamination of preferences and recommendations profiles (e.g., also referred to as "account contamination," in which one user's tastes erroneously contribute to recommendations made to another user). Thus, modifying the account information for the third electronic devices facilitates the provision of relevant (e.g., targeted) content to the matched device based on a profile (e.g., a preferences/recommendations profile) of the user who provided the voice command.

Also in response to identifying the third electronic device (526), the first electronic device transmits (532) instructions to the third electronic device to play the media content. In some embodiments, the instructions include the media content. In some embodiments, the instructions include a URI so that the third electronic device can retrieve the media content from a content distribution server (e.g., CDN 106, FIG. 1).

In some embodiments, after playback of the media content has finished, the first electronic device (534) updates, without user intervention, the account information for the third electronic device to associate the third electronic device with the second user (e.g., instead of the first user). Automatically updating account information for a device, without user intervention, after playback of media content has finished, increases the efficiency with which account information is updated (e.g., by eliminating the need for the user to provide input to update an active account for the device), which, in turn, reduces the processing power required to operate the device. In some embodiments, after playback of the media content has finished, the first electronic device maintains the account information for the third electronic device so that the third electronic device remains associated with the first user (e.g., instead of the second user). Maintaining the account information for a device after playback of media content has finished increases the efficiency with which the first user operates the device by enabling the first user to continue playing back media content without needing to continually reestablish the association between the user's account and the device.

Note that various operations of method 500 may be omitted in accordance with some embodiments. In some embodiments, another method is performed at the first electronic device that includes receiving a request from the first user of the second electronic device. The method includes determining from the request: one or more characteristics of a target device and one or more actions to be performed at the target device. The method includes, in accordance with a determination that the one or more characteristics of the target device do not match any devices of a set of candidate devices associated with the user at the first electronic device, sending a request to the second electronic device to search for local devices. The method further includes matching the target device to a local device found in the search for local devices (e.g., based on and/or using the one or more characteristics of the target device identified in the request) and transmitting instructions to the third electronic device to perform the action. The method may share any of the operations or features described above with reference to method 500, FIG. 5A-5B.

As another example, in some embodiments, a method is performed at a first electronic device having one or more processors and memory storing instructions for execution by the one or more processors (e.g. as described above with respect to method 500). The method includes receiving a voice command from a first user of a second electronic device, wherein the second electronic device is distinct from the first electronic device. The method further includes identifying, using the content of the voice command, a third electronic device that is distinct from the first electronic device and the second electronic device. The method further includes, in response to identifying the third electronic device: modifying account information for the third electronic device to associate the third electronic device with the first user; and transmitting instructions to the third electronic device to play the media content. The method may share any of the operations or features described above with reference to method 500, FIG. 5A-5B.

As another example, in some embodiments, a method is performed at a first electronic device having one or more processors and memory storing instructions for execution by the one or more processors (e.g. as described above with respect to method 500). The method includes receiving a voice command from a first user of a second electronic device, wherein the second electronic device is distinct from the first electronic device. The method further includes, in response to receiving the voice command from the first user of the second electronic device: modifying account information for the second electronic device to associate the second electronic device with the first user; and transmitting instructions to the second electronic device to play the media content. The method may share any of the operations or features described above with reference to method 500, FIG. 5A-5B.

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
   at a first electronic device, the first electronic device having one or more processors and memory storing instructions for execution by the one or more processors:
   receiving a voice command from a first user of a second electronic device, wherein the second electronic device is distinct from the first electronic device;
   determining from content in the voice command:
      one or more characteristics of a target device; and
      media content to be played on the target device;
   identifying, using the one or more characteristics of the target device determined from the voice command, a third electronic device that is distinct from the first electronic device and the second electronic device; and
   in response to identifying the third electronic device:
      modifying account information for the third electronic device to associate the third electronic device with the first user; and
      transmitting instructions to the third electronic device to play the media content.

2. The method of claim 1, wherein identifying the third electronic device includes matching the one or more characteristics of the target device against characteristics of a set of candidate devices.

3. The method of claim 2, wherein the set of candidate devices includes devices that the first user is logged into.

4. The method of claim 2, wherein the set of candidate devices includes devices that the first user has previously logged into.

5. The method of claim 2, wherein identifying the third electronic device includes, in accordance with a determination that the one or more characteristics of the target device do not match any devices of the set of candidate devices, sending a request to the second electronic device to search for local devices.

6. The method of claim 1, wherein the one or more characteristics of the target device include one or more characteristics selected from the group consisting of: a name of the target device, a brand of the target device, and a model of the target device.

7. The method of claim 1, wherein modifying the account information for the third electronic device to associate the third electronic device with the first user includes:
determining that a second user, distinct from the first user, is logged into the third electronic device; and
updating, without user intervention, the account information for the third electronic device so that the first user is logged into the third electronic device.

8. The method of claim 7, further including, after playback of the media content has finished, updating, without user intervention, the account information for the third electronic device to associate the third electronic device with the second user.

9. The method of claim 7, further including, after playback of the media content has finished, maintaining the account information for the third electronic device so that the third electronic device remains associated with the first user.

10. The method of claim 1, wherein the voice command identifies, as the media content, a song, album, genre, podcast, or playlist.

11. The method of claim 1, wherein the voice command includes one or more keywords that indicate whether the media content is a song, album, genre, podcast, or playlist.

12. The method of claim 1, wherein the first user is automatically identified using the voice command.

13. A first electronic device comprising:
one or more processors; and
memory storing instructions for execution by the one or more processors, the instructions including instructions for:
receiving a voice command from a first user of a second electronic device, wherein the second electronic device is distinct from the first electronic device;
determining from content in the voice command:
one or more characteristics of a target device; and
media content to be played on the target device;
identifying, using the one or more characteristics of the target device determined from the voice command, a third electronic device that is distinct from the first electronic device and the second electronic device; and
in response to identifying the third electronic device:
modifying account information for the third electronic device to associate the third electronic device with the first user; and
transmitting instructions to the third electronic device to play the media content.

14. A non-transitory computer-readable storage medium storing instructions which, when executed by a first electronic device that includes one or more processors, cause the first electronic device to:
receive a voice command from a first user of a second electronic device, wherein the second electronic device is distinct from the first electronic device;
determine from content in the voice command:
one or more characteristics of a target device; and
media content to be played on the target device;
identify, using the one or more characteristics of the target device determined from the voice command, a third electronic device that is distinct from the first electronic device and the second electronic device; and
in response to identifying the third electronic device:
modify account information for the third electronic device to associate the third electronic device with the first user; and
transmit instructions to the third electronic device to play the media content.

* * * * *